United States Patent
Chen et al.

(10) Patent No.: US 10,929,965 B2
(45) Date of Patent: Feb. 23, 2021

(54) HISTOGRAM STATISTICS CIRCUIT AND MULTIMEDIA PROCESSING SYSTEM

(71) Applicant: Huawei Technologies Co., Ltd., Shenzhen (CN)

(72) Inventors: Yunbi Chen, Shanghai (CN); Kai Hu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 81 days.

(21) Appl. No.: 16/456,916

(22) Filed: Jun. 28, 2019

(65) Prior Publication Data

US 2019/0318461 A1 Oct. 17, 2019

Related U.S. Application Data

(63) Continuation of application No. PCT/CN2017/119110, filed on Dec. 27, 2017.

(30) Foreign Application Priority Data

Dec. 30, 2016 (CN) .......................... 201611261579.2

(51) Int. Cl.
*G06T 5/40* (2006.01)
*G06F 9/30* (2018.01)
(Continued)

(52) U.S. Cl.
CPC ............ *G06T 5/40* (2013.01); *G06F 9/30145* (2013.01); *G06F 9/321* (2013.01); *G06F 17/18* (2013.01)

(58) Field of Classification Search
CPC ......... G06T 5/40; G06T 1/20; G06F 9/30145; G06F 17/18; G06F 9/321
See application file for complete search history.

(56) References Cited

U.S. PATENT DOCUMENTS

| 5,381,450 A | 1/1995 | Lane |
| 2002/0105579 A1 | 8/2002 | Levine et al. |

(Continued)

FOREIGN PATENT DOCUMENTS

| CN | 2838183 Y | 11/2006 |
| CN | 101674473 A | 3/2010 |

(Continued)

OTHER PUBLICATIONS

Nitin Sachdeva et al., "An FPGA Based Real-Time Histogram Equalization Circuit for Image Enhancement", Dec. 2010, International Journal of Electronics & Communication Technology, vol. 1, Issue 1, p. 63-67. (Year: 2010).*

(Continued)

*Primary Examiner* — Brenda C Bernardi
(74) *Attorney, Agent, or Firm* — Conley Rose, P.C.

(57) ABSTRACT

A histogram statistics circuit and a multimedia processing system, where the multimedia processing system includes a memory, a histogram statistics circuit, and a processor. The memory is configured to store multimedia data. The histogram statistics circuit is configured to obtain the multimedia data from the memory and perform histogram statistics on the multimedia data, to generate a statistical result. The processor is configured to process the multimedia data based on the statistical result and a histogram application algorithm.

17 Claims, 5 Drawing Sheets

(51) Int. Cl.
*G06F 9/32* (2018.01)
*G06F 17/18* (2006.01)

(56) References Cited

U.S. PATENT DOCUMENTS

| | | | |
|---|---|---|---|
| 2008/0272999 A1 | 11/2008 | Kurokawa et al. | |
| 2010/0232633 A1 | 9/2010 | Nielsen | |
| 2011/0116713 A1* | 5/2011 | Zeng | G06T 5/008 |
| | | | 382/167 |
| 2013/0287299 A1 | 10/2013 | Huang et al. | |

FOREIGN PATENT DOCUMENTS

| | | |
|---|---|---|
| CN | 103426159 A | 12/2013 |
| CN | 104217399 A | 12/2014 |
| CN | 106780415 A | 5/2017 |

OTHER PUBLICATIONS

Foreign Communication From a Counterpart Application, European Application No. 17888994.5, Extended European Search Report dated Sep. 6, 2019, 5 pages.
Machine Translation and Abstract of Chinese Publication No. CN2838183, Nov. 15, 2006, 18 pages.
Machine Translation and Abstract of Chinese Publication No. CN101674473, Mar. 17, 2010, 10 pages.
Machine Translation and Abstract of Chinese Publication No. CN103426159, Dec. 4, 2013, 21 pages.
Machine Translation and Abstract of Chinese Publication No. CN104217399, Dec. 17, 2014, 16 pages.
Machine Translation and Abstract of Chinese Publication No. CN106780415, May 31, 2017, 21 pages.
Cadenas, J., et al, "Parallel Pipelined Array Architectures for Real-time Histogram Computation in Consumer Devices," IEEE Transactions on Consumer Electronics, vol. 57, No. 4, Nov. 2011, pp. 1460-1464.
Foreign Communication From a Counterpart Application, Chinese Application No. 201611261579.2, Chinese Office Action dated Jul. 2, 2019, 5 pages.
Foreign Communication From a Counterpart Application, PCT Application No. PCT/CN2017/119110, English Translation of International Search Report dated Mar. 26, 2018, 2 pages.
Foreign Communication From a Counterpart Application, PCT Application No. PCT/CN2017/119110, English Translation of Written Opinion dated Mar. 26, 2018, 6 pages.

* cited by examiner

|  |  |  |  |  |  |  |  |
|---|---|---|---|---|---|---|---|
| P0 | P1 | P2 | P3 | P4 | P5 | P6 | P7 |
| P8 | P9 | P10 | P11 | P12 | P13 | P14 | P15 |
| P16 | P17 | P18 | P19 | P20 | P21 | P22 | P23 |
| P24 | P25 | P26 | P27 | P28 | P29 | P30 | P31 |
| P32 | P33 | P34 | P35 | P36 | P37 | P38 | P39 |
| P40 | P41 | P42 | P43 | P44 | P45 | P46 | P47 |
| P48 | P49 | P50 | P51 | P52 | P53 | P54 | P55 |
| P56 | P57 | P58 | P59 | P60 | P61 | P62 | P63 |

Data group 1 — top row (P0–P7)
Data group 2 — left column (P32, P40, P48, P56)
Data group 3 — bottom-right block (P36–P39, P44–P47, P52–P55, P60–P63)

HISTOGRAM STATISTICS CIRCUIT AND MULTIMEDIA PROCESSING SYSTEM

CROSS-REFERENCE TO RELATED APPLICATIONS

This application is a continuation of International Patent Application No. PCT/CN2017/119110, filed on Dec. 27, 2017, which claims priority to Chinese Patent Application No. 201611261579.2, filed on Dec. 30, 2016. The disclosures of the aforementioned applications are hereby incorporated by reference in their entireties.

TECHNICAL FIELD

The present disclosure relates to the electronic field, and in particular, to a histogram statistics circuit and a multimedia processing system.

BACKGROUND

At present, with increasing popularization of intelligent terminals and multimedia applications, people have increasingly high requirements on complex performance such as computer vision processing and image processing. In addition, requirements of intelligent terminals on real-time quality of multimedia applications also become higher. Therefore, hardware acceleration for multimedia computing is widely concerned.

In conventional approaches, multimedia processing of an intelligent terminal is mainly completed using a vector processor. Typical features of the vector processor are a very long instruction word (VLIW) and single-instruction multiple-data (SIMD) stream processing. Although the vector processor has a very strong instruction parallel processing capability and data parallel processing capability and can efficiently complete most multimedia processing tasks, there are still some special multimedia processing tasks difficult to be completed using an instruction of a general purpose processor, restricting application of some multimedia processing algorithms to the intelligent terminal. For example, histogram statistics is massively used in such algorithms as an image equalization algorithm (used to improve photo details and eliminate illumination unevenness and detail blurring during photographing) and a target recognition algorithm (including algorithms such as a facial recognition algorithm, a signpost recognition algorithm, and a goods recognition algorithm). Histogram statistics is used to count quantities of occurrence times of all image pixels whose values range from 0 to 255 in a picture, to obtain quantities of occurrence times of 256 types of pixels having different values. Further, the histogram statistics may further be used to count a feature graph, for example, a typical edge feature graph or a gradient feature graph, of the image. Currently, a quantity of pixels of a picture becomes larger as image resolution is improved. For example, a quantity of pixel points of a 1080p high-definition picture is close to two millions. To complete histogram statistics of a 1080p high-definition picture, a vector processor needs to repeatedly fetch 256 statistics counters for two million times. This causes an obvious fetch bottleneck and computing performance bottleneck.

Figure 1:
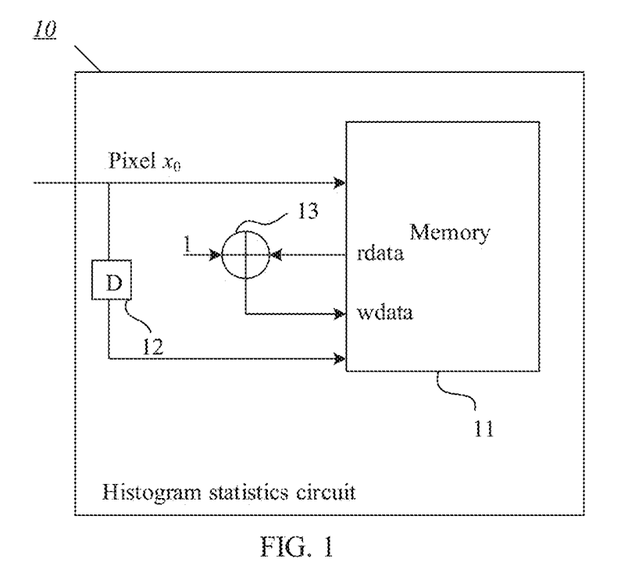
FIG. 1 is a schematic structural diagram of a memory-based histogram statistics circuit in conventional approaches.

A memory-based histogram statistics solution is provided in conventional approaches. As shown in FIG. 1, in a histogram statistics circuit 10, a memory 11 stores 256 statistical count values that are respectively in a one-to-one correspondence with 256 pixel values. A calculation process of the histogram statistics circuit 10 is as follows. First, a D flip-flop 12 uses a value of a current pixel $x_0$ as an offset address, and finds a statistical count value corresponding to the current pixel from the memory 11. Next, an adder 13 reads the statistical count value using a read port (rdata), adds 1 to the statistical count value, and writes back, into the memory 11 using a write port (wdata), the statistical count value to which 1 is added, in order to complete collection of statistics of the current pixel. For example, the value of the current pixel $x_0$ is 122, a statistical count value (counter 122) used for statistics of the pixel value 122 is found from the 256 statistical count values stored in the memory 11, then 1 is added to a current value of the counter 122, and then a new counter 122 is written back into the memory 11 using the write port, in order to complete collection of statistics of the pixel $x_0$ once. However, due to a limitation of a quantity of read ports and write ports of the memory 11 (a quantity of read ports and write ports of a memory is usually not greater than 2), the histogram statistics circuit 10 can collect statistics of only one or two pixels in one clock cycle. As such, for a high-resolution picture, computing performance of the histogram statistics circuit 10 cannot meet a real-time processing requirement of a multimedia application.

Therefore, a new histogram statistics circuit is urgently to be designed, to improve performance and reduce power consumption of a multimedia processor.

SUMMARY

Embodiments of the present disclosure provide a histogram statistics circuit having relatively high computing performance and a multimedia processing system, to meet an urgent requirement of a multimedia application on performance such as real-time processing.

According to a first aspect, the present disclosure provides a histogram statistics circuit. The histogram statistics circuit is coupled to a memory, and the memory stores multimedia data. The histogram statistics circuit includes a counter cache, a controller, a parsing circuit, a matching-and-decoding circuit, and a count value updating circuit. The controller is coupled to the counter cache, the parsing circuit, and the matching-and-decoding circuit, and the count value updating circuit is coupled between the counter cache and the matching-and-decoding circuit. The counter cache is configured to cache Y groups of counters, where each group of counters includes at least one counter and each counter corresponds to one current count value, and Y is a positive integer greater than 1. The controller is configured to control the memory to group pixels in the multimedia data in order to obtain M groups of data. The parsing circuit is configured to perform the following step: obtaining an $i^{th}$ group of data from the M groups of data, and parsing each pixel value in the $i^{th}$ group of data, in order to determine X groups of counters that match the $i^{th}$ group of data in the Y groups of counters stored in the counter cache, where X is a positive integer and $1 \leq X \leq Y$. The parsing circuit repeatedly performs the step until i=M, where i is a natural number whose starting value is 1 and is increased by 1 in each iterative process. The controller is further configured to control, based on the X groups of counters determined by the parsing circuit, the matching-and-decoding circuit to match the $i^{th}$ group of data with each of the X groups of counters in X clock cycles. The matching-and-decoding circuit is configured to perform the following step: in a $i^{th}$ clock cycle, matching each pixel in the $i^{th}$ group of data with a $j^{th}$ group of counters in the X groups of counters, and instructing, based on a matching result, the count value updating circuit to update a count value of the $j^{th}$ group of counters. The matching-and-decoding circuit repeatedly performs the step until j=X, where j is a natural number whose starting value is 1 and is increased by 1 in each iterative process. The count value updating circuit is configured to: read a current count value of the $i^{th}$ group of counters from the counter cache in the $j^{th}$ clock cycle, update the current count value of the $j^{th}$ group of counters based on the matching result indicated by the matching-and-decoding circuit, in order to obtain an updated count value of the $i^{th}$ group of counters, and write back the updated count value of the $i^{th}$ group of counters into the $j^{th}$ group of counters in the counter cache. Compared with a conventional memory-based histogram statistics circuit, the histogram statistics circuit provided in the present disclosure can collect statistics of a plurality of pixels in parallel in one clock cycle, thereby improving efficiency of the histogram statistics circuit.

Optionally, in an implementation, the controller is configured to control the memory to group the multimedia data by rows, by columns, or by matrices, in order to obtain the M groups of data. The multimedia data may be a grayscale image, and pixel values in the groups of data maintain desirable locality. Therefore, when histogram statistics is performed on the multimedia data, only a counter group matching a group of data currently under statistics may be focused on, and there is no need to traverse all the counters, thereby improving computing efficiency.

Optionally, in an implementation, the parsing circuit is configured to parse the value of each pixel in the $i^{th}$ group of data, determine a first value range of each pixel in the $i^{th}$ group of data, and determine, based on the first value range, the X groups of counters that match the $i^{th}$ group of data.

Optionally, in an implementation, the parsing circuit is configured to parse the value of each pixel in the $i^{th}$ group of data in order to obtain a maximum pixel value and a minimum pixel value in the $i^{th}$ group of data, and determine the first value range of the $i^{th}$ group of data based on the maximum pixel value and the minimum pixel value.

Optionally, in an implementation, the parsing circuit is configured such that when $Y=2^K$, the parsing circuit determines, based on K high-order bits of each pixel in the $i^{th}$ group of data, the X groups of counters that match the $i^{th}$ group of data, where K is a positive integer and $1 \leq K \leq 8$. The X groups of counters are determined using this manner, further reducing ineffective operations, and improving the computing efficiency of the histogram statistics circuit.

Optionally, in an implementation, the parsing circuit is further configured to generate indication information, and send the indication information to the controller to indicate the X groups of counters.

Optionally, in an implementation, the matching-and-decoding circuit is configured such that in the $i^{th}$ clock cycle, the matching-and-decoding circuit matches each pixel in the $i^{th}$ group of data with the $j^{th}$ group of counters. If any pixel in the $i^{th}$ group of data matches a first counter in the $j^{th}$ group of counters, the matching-and-decoding circuit instructs the count value updating circuit to update a current count value of the first counter.

Optionally, in an implementation, the matching-and-decoding circuit is further configured such that if no pixel in the $i^{th}$ group of data matches any counter in the $j^{th}$ group of counters, the matching-and-decoding circuit instructs the count value updating circuit to maintain the current count value of the $i^{th}$ group of counters unchanged.

Optionally, in an implementation, the count value updating circuit includes at least one adder, where a quantity of the at least one adder is equal to a quantity of counters in the $j^{th}$ group of counters, and where the at least one adder and the counters in the $j^{th}$ group of counters are in a one-to-one correspondence. Any adder is configured to read a current count value of a second counter corresponding to any such adder from the counter cache, and if the matching-and-decoding circuit indicates that any pixel in the $i^{th}$ group of data matches the second counter, that any such adder adds 1 to the current count value of the second counter to obtain an updated count value of the second counter, and writes back the updated count value of the second counter into the second counter in the counter cache to replace the current count value of the second counter.

Optionally, in an implementation, when a current count value of any counter stored in the counter cache is stored in two parts: a high-order part and a low-order part, where the low-order part includes low-order bits and an overflow bit that is set prior to the low-order bits. When adders configured to update the current count value of any such counter include a first adder and a second adder, bit widths of high-order bits and the low-order bits satisfy the following formulas:

$$\begin{cases} W_{CNT} > W_{data} \\ W_{CNT\_LOW} \geq W_{group} \\ W_{CNT} = W_{CNT\_LOW} + W_{CNT\_HIGH} \end{cases}$$

$W_{CNT}$ indicates a total bit width of the current count value of any counter, $W_{data}$ indicates a bit width of a quantity of pixels in the multimedia data, $W_{CNT\_LOW}$ indicates the bit width of the low-order bits, $W_{CNT\_HIGH}$ indicates the bit width of the high-order bits, and $W_{group}$ indicates a bit width of a quantity of pixels in any group of data in the M groups of data. The first adder is configured such that if the matching-and-decoding circuit indicates that any pixel in the $i^{th}$ group of data matches any counter, the first adder reads the low-order bits of the current count value of any such counter and adds 1, and write back an updated value of the low-order bits into the low-order part of that counter in the counter cache. The controller is further configured to detect the overflow bit, and if a value of the overflow bit is 1, and read the high-order bits of the current count value of any counter into the second adder, such that the second adder adds 1 and writes back an updated value of the high-order bits into the high-order part of any such counter in the counter cache. The current count value of the counter is divided into two parts: the high-order CNT_HIGH part and the low-order CNT_LOW part, for separate updating, thereby reducing a computing amount and reducing unnecessary access power consumption and adder computing power consumption.

According to a second aspect, the present disclosure provides a multimedia processing system, including a memory, the histogram statistics circuit according to any one of the first aspect and the optional implementations of the first aspect, and a processor. The memory is configured to store multimedia data. The histogram statistics circuit is configured to obtain the multimedia data from the memory, and perform histogram statistics on the multimedia data to generate a statistical result. The processor is configured to process the multimedia data based on the statistical result and a histogram application algorithm. In the multimedia processing system provided in the present disclosure, the histogram statistics circuit can complete calculation of a plurality of pixels in parallel, and the multimedia data is properly grouped, such that some ineffective operations are reduced. Therefore, computing efficiency of the multimedia processing system is greatly improved, and a requirement on real-time quality in a scenario such as facial recognition can be met.

Optionally, in an implementation, the histogram application algorithm includes a histogram equalization algorithm, an important image feature histogram of oriented gradients (HOG) algorithm, a mean shift algorithm, or a continuously adaptive mean shift algorithm.

Optionally, in an implementation, the multimedia processing system further includes an obtaining apparatus configured to obtain the multimedia data, and write the multimedia data into the memory.

Optionally, in an implementation, the processor and the histogram statistics circuit are integrated into a same integrated circuit (IC).

Optionally, in an implementation, the multimedia processing system is a mobile terminal or an in-vehicle device.

Optionally, in an implementation, the processor is a multimedia processor.

Optionally, in an implementation, the processor is a multimedia vector processor.

Optionally, in an implementation, the obtaining apparatus includes an image sensor or a graphics chip.

BRIEF DESCRIPTION OF DRAWINGS

To describe the technical solutions in the embodiments of the present disclosure or in other approaches more clearly, the following briefly describes the accompanying drawings. The accompanying drawings in the following description show merely some embodiments of the present disclosure, and persons of ordinary skill in the art may still derive other drawings from these accompanying drawings without creative efforts.

DESCRIPTION OF EMBODIMENTS

The following describes the technical solutions in embodiments of the present disclosure with reference to the accompanying drawings. The described embodiments are merely some but not all of the embodiments of the present disclosure. All other embodiments obtained by persons of ordinary skill in the art based on the embodiments of the present disclosure without creative efforts shall fall within the protection scope of the present disclosure.

Figure 2:
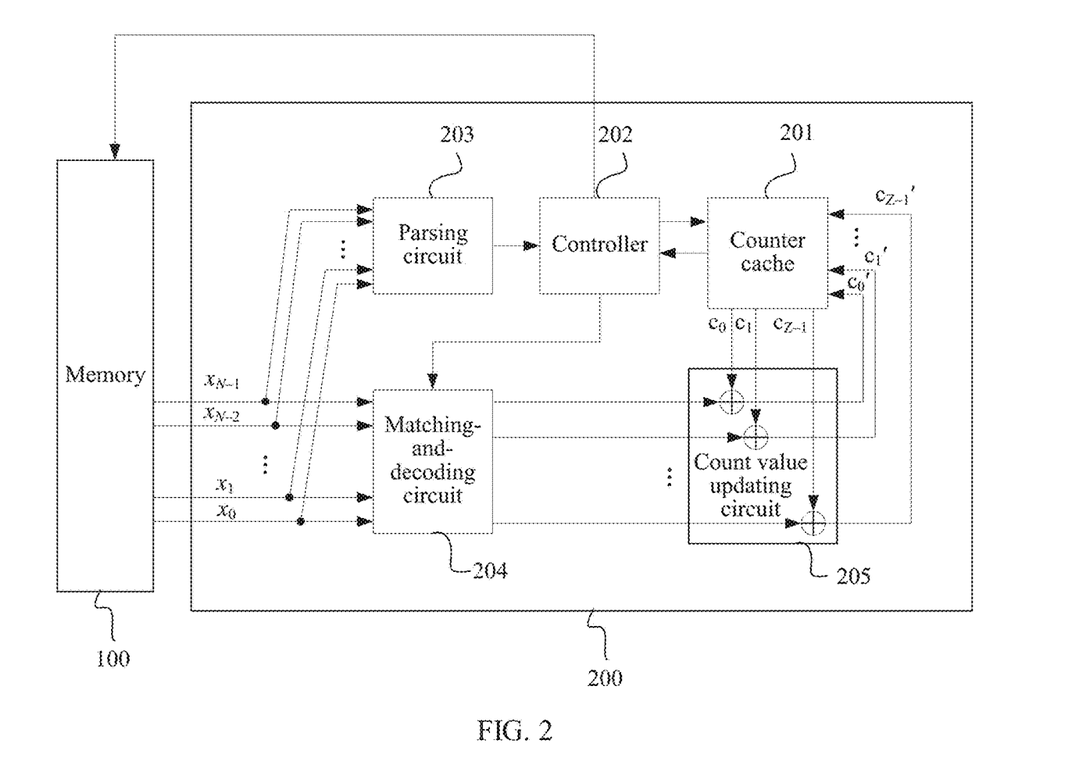
FIG. 2 is a schematic architectural diagram of a histogram statistics circuit according to an embodiment of the present disclosure.

As shown in FIG. 2, an embodiment of the present disclosure provides a histogram statistics circuit 200. The histogram statistics circuit 200 is coupled to a memory 100, and is configured to perform histogram statistics on multimedia data stored in the memory 100.

The histogram statistics circuit 200 may include a counter cache 201, a controller 202, a parsing circuit 203, a matching-and-decoding circuit 204, and a count value updating circuit 205. The controller 202 is coupled to the counter cache 201, the parsing circuit 203, and the matching-and-decoding circuit 204, and the count value updating circuit 205 is coupled between the counter cache 201 and the matching-and-decoding circuit 204.

The counter cache 201 is configured to cache Y groups of counters, where each group of counters includes at least one counter and each counter corresponds to one current count value, and Y is a positive integer greater than 1.

The controller 202 is configured to control the memory 100 coupled to the histogram statistics circuit 200 to group pixels in the multimedia data subject to statistics, in order to obtain M groups of data, where M is a positive integer greater than 1. As shown in FIG. 2, pixels in each group of data may be indicated as $x_0, x_1, \ldots,$ and $x_{N-1}$. Persons skilled in the art should know that the multimedia data is usually stored in a storage array of the memory 100. Therefore, that the controller 202 controls the memory 100 to group the multimedia data is implemented by controlling access to the multimedia data stored in the memory 100. For example, that the memory 100 divides the multimedia data into two groups is first accessing a storage array corresponding to a first group of data and then accessing a storage array corresponding to a second group of data.

The parsing circuit 203 is configured to perform the following step: obtaining an $i^{th}$ group of data from the M groups of data, and parsing each pixel value in the $i^{th}$ group of data, to determine X groups of counters that match the $i^{th}$ group of data in the Y groups of counters stored in the counter cache 201, where X is a positive integer and $1 \le X \le Y$. The parsing circuit 203 repeatedly performs the step until i=M, where i is a natural number whose starting value is 1 and is increased by 1 in each iterative process.

The controller 202 is further configured to control, based on the X groups of counters determined by the parsing circuit 203, the matching-and-decoding circuit 204 to match the $i^{th}$ group of data with each of the X groups of counters in X clock cycles.

The matching-and-decoding circuit 204 is configured to perform the following step: in a $j^{th}$ clock cycle, matching each pixel in the $i^{th}$ group of data with a $j^{th}$ group of counters in the X groups of counters, and instructing, based on a matching result, the count value updating circuit 205 to update a count value of the $j^{th}$ group of counters. The matching-and-decoding circuit 204 repeatedly performs the step until j=X, where j is a natural number whose starting value is 1 and is increased by 1 in each iterative process. It should be noted that the clock cycle herein is a time required for performing matching processing between each pixel in a group of data and a group of counters by the matching-and-decoding circuit 204. The clock cycle herein may include one or more system clock cycles.

The count value updating circuit 205 is configured to: read a current count value of the $j^{th}$ group of counters from the counter cache 201 in the $j^{th}$ clock cycle, update the current count value of the $j^{th}$ group of counters based on the matching result obtained by the matching-and-decoding circuit 204, in order to obtain an updated count value of the $i^{th}$ group of counters, and write back the updated count value of the $j^{th}$ group of counters into the $j^{th}$ group of counters in the counter cache 201, to replace the current count value of the $j^{th}$ group of counters.

Compared with a conventional memory-based histogram statistics circuit 10, histogram statistics performed on the multimedia data using the histogram statistics circuit 200 provided in this embodiment of the present disclosure is not limited by a quantity of read ports and write ports of the memory, and statistics of a plurality of pixels can be collected in parallel in one clock cycle, thereby improving efficiency of the histogram statistics circuit.

Persons skilled in the art should know that a value range of a pixel is between 0 and 255. Therefore, if the counter cache 201 stores eight groups of counters, each group of counters includes 32 counters, and each counter corresponds to one pixel value, 256 counters stored in the counter cache 201 in the histogram statistics circuit 200 may be used to count each pixel value in the range [0, 255]. Further, the 256 counters stored in the counter cache 201 may be numbered based on the pixel value corresponding to each counter. For example, a counter used to count a pixel value 0 is numbered C0, a counter used to count a pixel value 1 is numbered C1, and by analogy, a counter used to count a pixel value 255 is numbered C255. During grouping of the 256 counters, the 256 counters may be consecutively grouped based on numbers of the counters. For example, if the 256 counters are divided into eight groups and each group includes 32 counters, grouping may be as follows: a counter group 0 is (C0-C31), a counter group 1 is (C32-C63), a counter group 2 is (C64-C95), a counter group 3 is (C96-C127), a counter group 4 is (C128-C159), a counter group 5 is (C160-C191), a counter group 6 is (C192-C223), and a counter group 7 is (C224-C255). It should be noted that in this embodiment of the present disclosure, the 256 counters may also be grouped based on an actual requirement, and is not limited to being divided into eight groups. For example, the 256 counters may be divided into 16 groups, and each group includes 16 counters. Alternatively, the 256 counters may be divided into four groups, and each group includes 64 counters. In addition, a quantity of counters in the present disclosure is not limited to 256, and may be specially set based on a feature of a statistic object. For example, if a value range of the statistic object is [0, 1000], 1001 counters may be set in the counter cache 201.

In this embodiment, for example, assuming that the multimedia data stored in the memory 100 includes L pixels in total, the controller 202 may control the memory 100 to divide the L pixels into M groups, where each group of data includes N (N=L/M) pixels. N and L are both positive integers, and, values of N and L may both be greater than or equal to 2. For example, if the multimedia data includes 1024 pixel points, the multimedia data may be divided into 16 groups, and each group of data includes 64 pixels.

Figure 3:
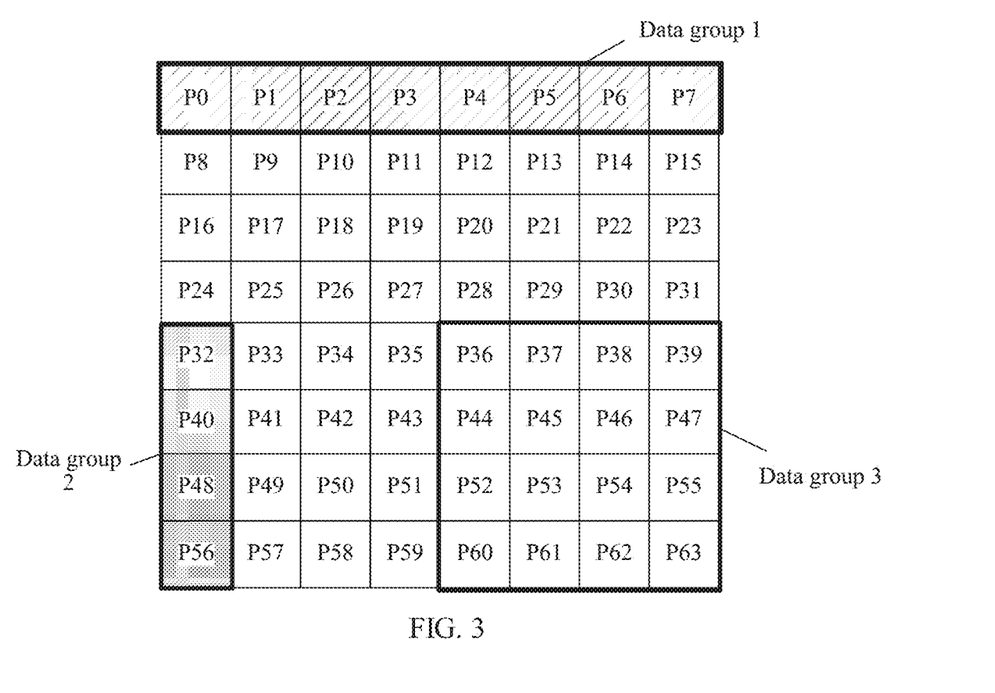
FIG. 3 is a schematic diagram of performing group-based access to multimedia data by a memory.

Further, when the multimedia data is a natural image, as shown in FIG. 3 (P0 to P63 being used to indicate pixels in FIG. 3). Values of neighboring pixels in a natural image are approximate and have desirable locality, that is, a natural image may be a grayscale image, and a case in which a pixel value of a pixel (for example, P0) is 0 and a pixel value of a neighboring pixel (for example, P1 or P8) of the pixel is 255 usually does not occur in a grayscale image. In addition, the pixels in the multimedia data are stored in the memory 100 in a matrix form, and the multimedia data is usually read or written row by row. Therefore, when the controller 202 controls the memory 100 to group the pixels in the multimedia data, the controller 202 may be configured to control the memory 100 to perform group-based access to the multimedia data by rows, by columns, or by matrices, to obtain the M groups of data and limit a value of a pixel in any group of data within a value range less than [0, 255]. For example, referring to FIG. 3, like a data group 1 (including pixels P0 to P7) shown in the figure, the controller 202 may control the memory 100 to use, as a group of data, each row of pixels in the multimedia data stored in the memory 100.

Alternatively, like a data group 2 (including pixels P32, P40, P48, and P56) shown in the figure, the memory 100 may use each column of pixels in the multimedia data as a group of data. Further alternatively, like a data group 3 (including 16 pixels in a 4×4 block), the memory 100 may use pixels in each matrix in the multimedia data as a group of data. A natural image has continuity in both a horizontal direction and a vertical direction. Therefore, pixel values in each group of data shown in FIG. 3 have desirable locality, such that when the histogram statistics circuit 200 performs histogram statistics on the natural image, only a counter group matching a group of data currently under statistics collection is focused on, and there is no need to traverse all the counters, that is, calculations by lots of ineffective counter groups are skipped. Therefore, in a same time, the histogram statistics circuit 200 can perform more effective calculations, thereby significantly improving computing performance. It should be learned that when grouping the multimedia data by rows, by columns, or by matrices, the memory 100 performs group-based access to the multimedia data in the storage array in the memory 100 by rows, by columns, or by matrices.

In an implementation of the present disclosure, the parsing circuit 203 may parse the value of each pixel in the $i^{th}$ group of data, determine a first value range of each pixel in the $i^{th}$ group of data, and determine, based on the first value range, the X groups of counters that match the $i^{th}$ group of data.

In some embodiments, the parsing circuit 203 may parse the value of each pixel in the $i^{th}$ group of data, to obtain a maximum pixel value and a minimum pixel value in the $i^{th}$ group of data, and determine the first value range based on the maximum pixel value and the minimum pixel value. For example, if the parsing circuit 203 determines, through parsing, that the maximum pixel value in the $i^{th}$ group of data is 55 and the minimum pixel value is 5, the parsing circuit 203 may determine that the first value range of the pixel in the $i^{th}$ group of data is [5, 55]. For example, if the counter cache 201 stores 256 counters and the 256 counters are equally divided into eight groups, correspondingly, the parsing circuit 203 may determine, based on the first value range [5, 55], that a counter group 0 (C0-C31) and a counter group 1 (C32-C63) match the $i^{th}$ group of data.

For example, if the first value range of the $i^{th}$ group of data is [100, 200], the parsing circuit 203 may determine that a counter group 3 (C96-C127), a counter group 4 (C128-C159), a counter group 5 (C160-C191), and a counter group 6 (C192-C223) match the $i^{th}$ group of data. This is because that a counter C100 corresponding to a pixel value 100 is in the counter group 3 (C96-C127), and a counter C200 corresponding to a pixel value 200 is in the counter group 6 (C192-C223). Because pixel values of the rest pixels fall within 100 to 200, corresponding counters may be in the counter group 3 (C96-C127), the counter group 4 (C128-C159), the counter group 5 (C160-C191), and the counter group 6 (C192-C223). By using this manner, the X groups of counters that correspond to the $i^{th}$ group of data may be easily determined. However, it should be learned that the X groups of counters herein are consecutive, and in the $i^{th}$ group of data, there may be no pixel that can match a group of counters in the X groups of counters. For example, it is still assumed that the first value range of the $i^{th}$ group of data is [100, 200], but in the $i^{th}$ group of data, there is no pixel whose value falls within a value range [160, 191], that is, the $i^{th}$ group of data does not match the counter group 5 (C160-C191). When histogram statistics is performed on the $i^{th}$ group of data, calculation for the counter group 5 (C160-C191) may be considered ineffective.

In another implementation of the present disclosure, because the value range of the pixel value is [0, 255], any pixel value may be indicated using an 8-digit binary number (bits). Therefore, the parsing circuit 203 may further determine, based on a high-order bit of the value of each pixel in the $i^{th}$ group of data, the X groups of counters that match the $i^{th}$ group of data. For example, when the counter cache 201 stores 256 counters, and the 256 counters are equally divided into eight groups, the parsing circuit 203 may determine, using three high-order bits of each pixel in the $i^{th}$ group of data, the X groups of counters that match the $i^{th}$ group of data. It is assumed that the $i^{th}$ group of data includes two pixels and pixel values of the two pixels are respectively 30 (00011110 in binary representation) and 50 (00110010 in binary representation). It may be learned, based on grouping of the 256 counters, that a counter C30 corresponding to the pixel value 30 is in a counter group 0 (C0-C31), and a counter C50 corresponding to the pixel value 50 is in a counter group 1 (C32-C63). In this implementation, the parsing circuit 203 may parse three high-order bits (000 and 001) of the two pixel values, in order to determine that the counter group 0 (C0-C31) and the counter group 1 (C32-C63) correspond to the $i^{th}$ group of data. This is because that there is the following correspondence between a decimal number and a binary number: a decimal value range [0, 31] is expressed in binary form as [00000000, 00011111], a decimal value range [32, 63] is expressed in binary form as [00100000, 00111111], a decimal value range [64, 95] is expressed in binary form as [01000000, 01011111], and the rest can be deduced by analogy. The three high-order bits and the numbers of the counters are exactly in a one-to-one correspondence. For example, 000 corresponds to the counter group 0, 001 corresponds to the counter group 1, 010 corresponds to a counter group 2, and the like. Therefore, the parsing circuit 203 may obtain, based on the three high-order bits in the 8-digit binary number, a group of counters in which a counter corresponding to the 8-digit binary number is located. It may be learned that in this implementation, any group of counters in the X groups of counters can match at least one pixel in the $i^{th}$ group of data. Compared with the foregoing solution of determining the X groups of counters based on the maximum pixel value and the minimum pixel value in the $i^{th}$ group of data, the solution in this implementation can further reduce ineffective operations, thereby improving the computing efficiency of the histogram statistics circuit 200.

For another example, when the counter cache 201 stores 256 counters, and the 256 counters are equally divided into 16 groups, a counter group 0 is (C0-C15), a counter group 1 is (C16-C31), a counter group 2 is (C32-C47), and the rest can be deduced by analogy. If the pixel values of the pixels included in the $i^{th}$ group of data are respectively 20 (00010100 in binary representation), 40 (00101000 in binary representation), and 80 (01010000 in binary representation), four high-order bits of the three pixels are respectively 0001 (1 in decimal form), 0010 (2 in decimal form), and 0101 (5 in decimal form), and the parsing circuit 203 may learn, based on these four high-order bits, that the counter group 1 (C16-C31), the counter group 2 (C32-C47), and a counter group 5 (C80-C95) match the $i^{th}$ group of data.

In conclusion, it may be learned that when $Y=2^K$, that is, the 256 counters are divided into $2^K$ groups, the parsing circuit 203 may determine, based on K high-order bits of each pixel in the $i^{th}$ group of data, the X groups of counters that match the $i^{th}$ group of data, where K is a positive integer and $1 \leq K \leq 8$. For example, when the 256 counters are divided into 16 ($2^4$) groups, the X groups of counters that match the $i^{th}$ group of data may be determined based on four high-order bits. Alternatively, when the 256 counters are divided into eight ($2^3$) groups, the X groups of counters that match the $i^{th}$ group of data may be determined based on three high-order bits.

Further, the parsing circuit 203 may further be configured to generate indication information, and send the indication information to the controller 202, in order to indicate the X groups of counters determined by the parsing circuit 203.

For example, when $Y=2^K$, the parsing circuit 203 may send the K high-order bits of each pixel in the $i^{th}$ group of data to the controller 202. The controller 202 may learn of, based on the K high-order bits, the X groups of counters determined by the parsing circuit 203.

In this embodiment of the present disclosure, before the controller 202 controls the matching-and-decoding circuit 204 to match the $i^{th}$ group of data with each of the X groups of counters in the X clock cycles, the controller 202 may further set the corresponding X clock cycles based on the X groups of counters determined by the parsing circuit 203. For example, if the parsing circuit 203 determines, using the foregoing implementation, that three groups (X=3) of counters that match the $i^{th}$ group of data are respectively a counter group 1 (C16-C31), a counter group 2 (C32-C47), and a counter group 5 (C80-C95), the controller 202 may correspondingly set three clock cycles, control, in a first clock cycle, the matching-and-decoding circuit 204 to match a first group of counters (that is, the counter group 1 (C16-C31)) in the three groups of counters, control, in a second clock cycle, the matching-and-decoding circuit 204 to match a second group of counters (that is, the counter group 2 (C32-C47)) in the three groups of counters, and control, in a third clock cycle, the matching-and-decoding circuit 204 to match a third group of counters (that is, the counter group 5 (C80-C95)) in the three groups of counters. Correspondingly, if the parsing circuit 203 determines that four groups (X=4) of counters that match the $i^{th}$ group of data, the controller 202 may correspondingly set four clock cycles, and control, in the four clock cycles, the matching-and-decoding circuit 204 to match the $i^{th}$ group of data with the four groups of counters one by one.

In this embodiment of the present disclosure, the matching-and-decoding circuit 204 is configured such that in the $j^{th}$ clock cycle in the X clock cycles, the matching-and-decoding circuit 204 matches each pixel in the $i^{th}$ group of data with the $j^{th}$ group of counters in the X groups of counters. Additionally, if any pixel in the $i^{th}$ group of data matches a first counter in the $j^{th}$ group of counters, the matching-and-decoding circuit 204 instructs the count value updating circuit 205 to update a count value of the first counter.

Further, for the foregoing solution of determining the X groups of counters based on the maximum pixel value and the minimum pixel value in the $i^{th}$ group of data, because one or more groups of counters in the determined X groups of counters may be redundant (that is, the one or more groups of counters cannot match any pixel in the $i^{th}$ group of data), the matching-and-decoding circuit 204 is further configured such that if no pixel in the $i^{th}$ group of data matches any counter in the $j^{th}$ group of counters, the matching-and-decoding circuit 204 instructs the count value updating circuit 205 to maintain the current count value of the $j^{th}$ group of counters unchanged.

For example, it is assumed that the pixel values of the pixels in the $i^{th}$ group of data are respectively (3, 5, 5, 37), and the 256 counters in the counter cache 201 are divided into eight groups. According to the foregoing implementation, it may be learned that the X groups of counters that match the group of data (3, 5, 5, 37) are a counter group 0 (C0-C31) and a counter group 1 (C32-C63). The counter group 0 (C0-C31) herein may be used as a first group of counters in the two groups of counters, and the counter group 1 (C32-C63) may be used as a second group of counters in the two groups of counters. Correspondingly, the matching-and-decoding circuit 204 matches the group of data (3, 5, 5, 37) with the counter group 0 (C0-C31) in a first clock cycle. The pixel values (3, 5, 5) fall in a value range [0, 31]. Therefore, it may be learned that counters in the counter group 0 (C0-C31) (that is, the first group of counters) that match the three pixel values are respectively a counter C3 and a counter C5. The matching-and-decoding circuit 204 may instruct the count value updating circuit 205 to add 1 to a current count value of the counter C3 and add 2 to a current count value of the counter C5, and keep current count values of remaining counters unchanged, in order to update the count values of the group 0 of counters (C0-C31). Then, in a second clock cycle, the matching-and-decoding circuit 204 matches the group of data (3, 5, 5, 37) with the counter group 1 (C32-C63) (that is, the second group of counters). Only the pixel value 37 falls within a value range [32, 63]. Therefore, it may be learned that a counter C37 in the counter group 1 (C32-C63) matches the group of data (3, 5, 5, 37), and the matching-and-decoding circuit 204 may instruct the count value updating circuit 205 to add 1 to a current count value of the counter C37.

In this embodiment of the present disclosure, referring to FIG. 2, the count value updating circuit 205 may include at least one adder, a quantity of the at least one adder is equal to a quantity of counters in the $j^{th}$ counter, and the at least one adder and the counters in the $j^{th}$ counter are in a one-to-one correspondence. Any adder is configured to read a current count value (indicated by $c_1$) of a second counter corresponding to that adder from the counter cache 201. If the matching-and-decoding circuit 204 indicates that any pixel in the $i^{th}$ group of data matches the second counter, that adder adds 1 to the current count value of the second counter to obtain an updated count value (indicated by $c_1'$) of the second counter, and writes back the updated count value $c_1'$ of the second counter into the second counter of the counter cache 201 to replace the current count value $c_1$ of the second counter as a current count value of the second counter in a next clock cycle. If the matching-and-decoding circuit 204 indicates that no pixel in the $i^{th}$ group of data matches the second counter, the adder maintains the current count value of the second counter unchanged.

Figure 4:
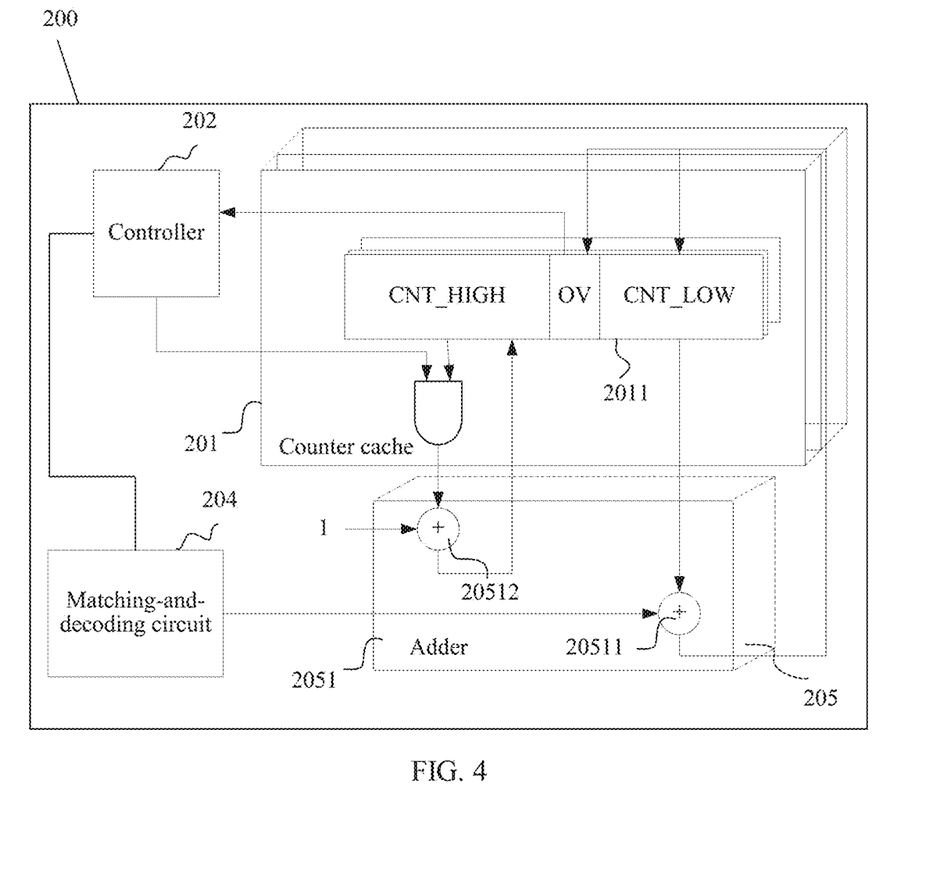
FIG. 4 is a schematic architectural diagram of another histogram statistics circuit according to an embodiment of the present disclosure.

In this embodiment of the present disclosure, as shown in FIG. 4, a current count value of any counter 2011 stored in the counter cache 201 may be stored in two parts: a high-order (CNT_HIGH) part and a low-order (CNT_LOW) part, and the low-order part includes low-order bits CNT_LOW and an overflow bit (OV), that is, an overflow bit (OV) is further set prior to the low-order bits (CNT_LOW). If the low-order bits CNT_LOW overflow, the overflow bit (OV) is 1. Otherwise, if the low-order bits CNT_LOW do not overflow, the overflow bit (OV) is 0. Bit widths of high-order bits (CNT_HIGH) and the low-order bits (CNT_LOW) satisfy the following formulas:

$$\begin{cases} W_{CNT} > W_{data} \\ W_{CNT\_LOW} \geq W_{group} \\ W_{CNT} = W_{CNT\_LOW} + W_{CNT\_HIGH} \end{cases}$$

$W_{CNT}$ indicates a total bit width of the current count value, $W_{data}$ indicates a bit width of a quantity of pixels in the multimedia data, $W_{CNT\_LOW}$ indicates the bit width of the low-order bits CNT_LOW, $W_{CNT\_HIGH}$ indicates the bit width of the high-order bits CNT_HIGH, and $W_{group}$ indicates a bit width of a quantity of pixels in any group of data in the M groups of data that are obtained after the multimedia data is grouped.

For example, if the multimedia data includes 1024 ($2^{10}$) pixels, $W_{data}$ is 10. To ensure that overflow does not occur in the counter 2011 during statistics collection, $W_{CNT}$ may only need to be 1 bit greater than $W_{data}$, that is, $W_{CNT}$ is 11. Correspondingly, if the 1024 pixels are divided into 16 groups, and each group includes 64 ($2^6$) pixels, that is, $W_{group}$ is 6, $W_{CNT\_LOW}$ may be 6 or greater than 6. Correspondingly, $W_{CNT\_HIGH}$ may be 5 or less than 5.

In addition, it should be noted that overflow means that a value exceeds a current count range of a counter. For example, a bit width of a binary current count value is 4 bits, and a decimal value corresponding to a maximum value 1111 of the binary current count value is 15. If 1 needs to be added to 15, the count range of the counter is exceeded, causing overflow.

Correspondingly, an adder 2051 configured to update the current count value of the counter 2011 is also split into two adders having a small bit width: a first adder 20511 and a second adder 20512. The first adder 20511 is configured to calculate the low-order bits CNT_LOW of the current count value, and the second adder 20512 is configured to calculate the high-order bits CNT_HIGH of the current count value. It should be noted that because the first adder 20511 and the second adder 20512 are not simultaneously used, in an example implementation solution, a same adder having a small bit width may be reused in a time division multiplexing manner, or two independent adders may be used.

When the matching-and-decoding circuit 204 indicates that one pixel in the $i^{th}$ group of data matches the counter 2011, a calculation process may be as follows.

The first adder 20511 reads the low-order bits CNT_LOW of the current count value of the counter and adds 1, and writes back an updated value of the low-order bits CNT_LOW into the low-order part of the counter 2011 in the counter cache, in order to replace the value of the original low-order bits CNT_LOW.

The controller 202 detects the overflow bit (OV). If the overflow bit is 1, the controller 202 reads the high-order bits CNT_HIGH of the current count value of the counter 2011 into the second adder 20512. The second adder 20512 adds 1 to update the high-order bits CNT_HIGH, and writes back an updated value into the high-order part of the counter 2011 in the counter cache, in order to replace the original high-order bits CNT_HIGH.

That is, after the first counter 20511 adds a new statistical value to the read low-order bits CNT_LOW, the controller 202 controls the counter cache 201 to update the low-order bits CNT_LOW and the overflow bit OV of the current count value of the counter. If the updated count value of the low-order bits CNT_LOW does not overflow, the overflow bit OV is set to 0. If the updated count value of the low-order bits CNT_LOW overflows, the overflow bit OV is updated to 1. When the overflow bit is 1, the controller 202 further controls the counter cache 201 to read the high-order bits CNT_HIGH of the current count value. The second adder 20512 adds 1, and writes back the updated value of the high-order bits CNT_HIGH into the high-order part of the counter 2011 in the counter cache 201, to replace the value of the original high-order bits CNT_HIGH.

In this embodiment, the current count value of the counter 2011 is divided into two parts: the high-order CNT_HIGH part and the low-order CNT_LOW part. The current count value of the counter 2011 may be divided into these two parts for separate updating, thereby reducing a computing amount and reducing unnecessary access power consumption and adder computing power consumption.

Figure 5:
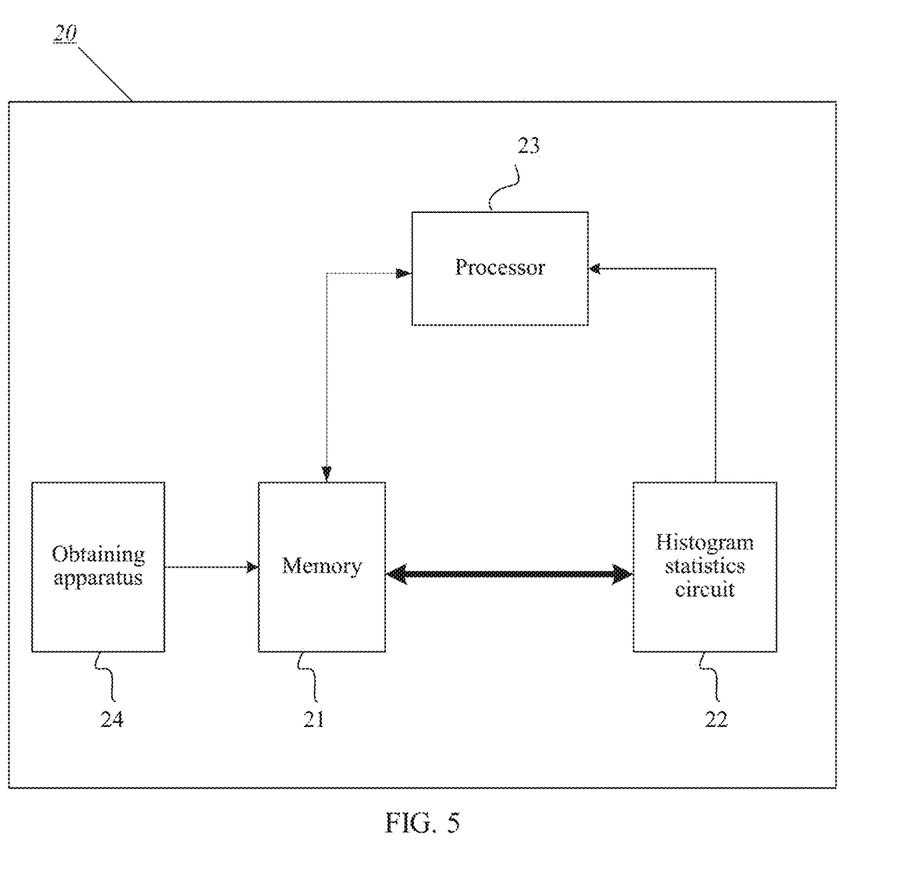
FIG. 5 is a schematic architectural diagram of a multimedia processing system according to an embodiment of the present disclosure.

As shown in FIG. 5, another embodiment of the present disclosure further provides a multimedia processing system 20 including a memory 21, a histogram statistics circuit 22, and a processor 23.

The memory 21 is configured to store multimedia data.

The histogram statistics circuit 22 is configured to obtain the multimedia data from the memory 21, and perform histogram statistics on the multimedia data to generate a statistical result. For a structure of the histogram statistics circuit 22, refer to a structure of the histogram statistics circuit 200 in FIG. 2 and FIG. 4. For a function of the histogram statistics circuit 22, refer to the descriptions of the histogram statistics circuit 200 in the foregoing embodiment. Details are not described herein again. It should be noted that after the histogram statistics circuit 22 completes histogram statistics on all groups of data of the multimedia data, the statistical result is final updated count values of Y groups of counters stored in the counter cache 201. Correspondingly, the processor 23 may read the final updated count values of the Y groups of counters from the counter cache 201.

The processor 23 is configured to process the multimedia data based on the statistical result and a histogram application algorithm. The histogram application algorithm may be various algorithms using a histogram for image processing. Examples are as follows. 1. A histogram equalization algorithm. This algorithm is applied to the image processing field, and can make contrast of an image more obvious and resolve a problem of poor photo exposure by adjusting a histogram of the image. 2. An important image feature Histogram of Oriented Gradients (HOG) algorithm. This algorithm is applied to the computer vision field, and is widely applied to target detection and target recognition. After the multimedia data is processed using the algorithm, pedestrian detection, facial recognition, vehicle license plate detection, and the like can be implemented. 3. An algorithm for detecting a specific object using an image histogram. This algorithm is applied to a computer vision field and may include a mean shift (meanshift) algorithm, a Continuously Adaptive Mean (CAM) SHIFT (CamShift) algorithm, and the like. The algorithm may be used to detect a human face location and the like.

It should be learned that an instruction related to the histogram application algorithm may also be stored in the memory 21. The processor 23 reads the instruction stored in the memory 21 to execute the corresponding histogram application algorithm.

In the multimedia processing system 20 provided in this embodiment of the present disclosure, the histogram statistics circuit 22 can complete calculation of a plurality of pixels in parallel, and the multimedia data is properly grouped, such that some ineffective operations are reduced. Therefore, computing efficiency of the multimedia processing system 20 is greatly improved, and a requirement on real-time quality in a scenario such as facial recognition can be met.

In this embodiment of the present disclosure, the multimedia processing system 20 may be a mobile terminal, for example, a mobile phone or a tablet computer, or may be an in-vehicle device or the like. In addition, the processor 23 is a multimedia processor, for example, a multimedia vector processor.

Further, the multimedia processing system 20 may further include an obtaining apparatus 24 configured to obtain the multimedia data and write the multimedia data into the memory 21. The obtaining apparatus 24 may include an image sensor, a camera, a graphics chip, and the like.

Further, the processor 23 and the histogram statistics circuit 22 may further be integrated into a same integrated circuit (IC).

It should be understood that embodiments described herein are merely common embodiments of the present disclosure, but are not intended to limit the present disclosure. Any modification, equivalent replacement, and improvement made without departing from the principle of the present disclosure shall fall within the protection scope of the present disclosure.

What is claimed is:

1. A histogram statistics circuit coupled to a memory that stores multimedia data, wherein the histogram statistics circuit comprises:

a counter cache configured to cache Y groups of counters, wherein each group of counters comprises at least one counter and each counter corresponds to one current count value, and Y is a positive integer greater than 1;

a controller coupled to the counter cache, wherein the controller is configured to control the memory to group pixels in the multimedia data, to obtain M groups of data;

a parsing circuit configured to perform a process that comprises obtaining an $i^{th}$ group of data from the M groups of data, and parsing each pixel value in the $i^{th}$ group of data to determine X groups of counters that match the $i^{th}$ group of data in the Y groups of counters stored in the counter cache, wherein X is a positive integer and $1 \leq X \leq Y$, wherein the parsing circuit repeatedly performs the process until i=M, wherein i is a natural number whose starting value is 1 and is increased by 1 in each iterative process, wherein the controller is further configured to control, based on the X groups of counters determined by the parsing circuit, a matching-and-decoding circuit to match the $i^{th}$ group of data with each of the X groups of counters in X clock cycles, wherein the matching-and-decoding circuit is coupled to the controller and is configured to perform a second process such that in a $j^{th}$ clock cycle, the matching-and-decoding circuit matches each pixel in the $i^{th}$ group of data with a $j^{th}$ group of counters in the X groups of counters, and instructs, based on a matching result, a count value updating circuit to update a count value of the $j^{th}$ group of counters, wherein the matching-and-decoding circuit repeatedly performs the second process until j=X, wherein j is a natural number whose starting value is 1 and is increased by 1 in each iterative process, wherein the count value updating circuit is coupled between the counter cache and the matching-and-decoding circuit, wherein the count value updating circuit is configured to:

read a current count value of the $j^{th}$ group of counters from the counter cache in the $j^{th}$ clock cycle;

update the current count value of the $j^{th}$ group of counters based on the matching result indicated by the matching-and-decoding circuit, to obtain an updated count value of the $j^{th}$ group of counters; and write back the updated count value of the $j^{th}$ group of counters into the $j^{th}$ group of counters in the counter cache.

2. The histogram statistics circuit according to claim 1, wherein the controller is configured to control the memory to group the multimedia data by rows, columns, or matrices, to obtain the M groups of data.

3. The histogram statistics circuit according to claim 1, wherein the parsing circuit is configured to:
parse each pixel value in the $i^{th}$ group of data;
determine a first value range of each pixel value in the $i^{th}$ group of data; and
determine, based on the first value range, the X groups of counters that match the $i^{th}$ group of data.

4. The histogram statistics circuit according to claim 3, wherein the parsing circuit is configured to:
parse each pixel value in the $i^{th}$ group of data, to obtain a maximum pixel value and a minimum pixel value in the $i^{th}$ group of data; and
determine the first value range of the $i^{th}$ group of data based on the maximum pixel value and the minimum pixel value.

5. The histogram statistics circuit according to claim 3, wherein the parsing circuit is configured such that when $Y=2^K$, the parsing circuit determines, based on K high-order bits of each pixel in the $i^{th}$ group of data, the X groups of counters that match the $i^{th}$ group of data, wherein K is a positive integer and $1 \leq K \leq 8$.

6. The histogram statistics circuit according to claim 1, wherein the parsing circuit is further configured to:
generate indication information; and
send the indication information to the controller to indicate the X groups of counters.

7. The histogram statistics circuit according to claim 1, wherein the matching-and-decoding circuit is configured such that in the $j^{th}$ clock cycle, the matching-and-decoding circuit matches each pixel value in the $i^{th}$ group of data with the $j^{th}$ group of counters, and when a pixel in the $i^{th}$ group of data matches a first counter in the $j^{th}$ group of counters, the matching-and-decoding circuit instructs the count value updating circuit to update a current count value of the first counter.

8. The histogram statistics circuit according to claim 7, wherein the matching-and-decoding circuit is further configured such that when no pixel in the $i^{th}$ group of data matches any counter in the $j^{th}$ group of counters, the matching-and-decoding circuit instructs the count value updating circuit to maintain the current count value of the $j^{th}$ group of counters unchanged.

9. The histogram statistics circuit according to claim 1, wherein the count value updating circuit comprises at least one adder, wherein a quantity of the at least one adder is equal to a quantity of counters in the $j^{th}$ group of counters, wherein the at least one adder and the counters in the $j^{th}$ group of counters are in a one-to-one correspondence.

10. The histogram statistics circuit according to claim 9, wherein a first adder selected from the at least one adder is configured to:
read a current count value of a second counter corresponding to the first adder from the counter cache; and
when the matching-and-decoding circuit indicates that a pixel in the $i^{th}$ group of data matches the second counter, the first adder adds 1 to the current count value of the second counter to obtain an updated count value of the second counter, and writes back the updated count value of the second counter into the second counter in the counter cache to replace the current count value of the second counter.

11. The histogram statistics circuit according to claim 1, wherein when a current count value of any a counter stored in the counter cache is stored in two parts comprising a high-order part and a low-order part, the low-order part comprises low-order bits and an overflow bit that is set prior to the low-order bits, and when adders configured to update the current count value of the counter comprise a first adder and a second adder, bit widths of high-order bits and the low-order bits satisfy the following formulas:

$$\begin{cases} W_{CNT} > W_{data} \\ W_{CNT\_LOW} \geq W_{group} \\ W_{CNT} = W_{CNT\_LOW} + W_{CNT\_HIGH} \end{cases},$$

wherein $W_{CNT}$ indicates a total bit width of the current count value of the counter, $W_{data}$ indicates a bit width of a quantity of pixels in the multimedia data, $W_{CNT\_LOW}$ indicates the bit width of the low-order bits, $W_{CNT\_HIGH}$ indicates the bit width of the high-order bits, and $W_{group}$ indicates a bit width of a quantity of pixels in any group of data in the M groups of data.

12. The histogram statistics circuit according to claim 11, wherein the first adder is configured such that when the matching-and-decoding circuit indicates that a pixel in the $i^{th}$ group of data matches the counter, the first adder reads the low-order bits of the current count value of the counter and add 1, and writes back an updated value of the low-order bits into the low-order part of the counter in the counter cache.

13. The histogram statistics circuit according to claim 12, wherein the controller is further configured to:
detect the overflow bit; and
when a value of the overflow bit is 1, read the high-order bits of the current count value of the counter into the second adder, such that the second adder adds 1 and writes back an updated value of the high-order bits into the high-order part of the counter in the counter cache.

14. A multimedia processing system, comprising:
a memory configured to store multimedia data;
a histogram statistics circuit configured to obtain the multimedia data from the memory and perform histogram statistics on the multimedia data, to generate a statistical result; and
a processor configured to process the multimedia data based on the statistical result and a histogram application algorithm,
wherein the histogram statistics circuit comprises a counter cache, a controller, a parsing circuit, a matching-and-decoding circuit, and a count value updating circuit, wherein the controller is coupled to the counter cache, the parsing circuit, and the matching-and-decoding circuit, and wherein the count value updating circuit is coupled between the counter cache and the matching-and-decoding circuit,
wherein the counter cache is configured to cache Y groups of counters, wherein each group of counters comprises at least one counter and each counter corresponds to one current count value, and Y is a positive integer greater than 1,
wherein the controller is configured to control the memory to group pixels in the multimedia data, to obtain M groups of data,
wherein the parsing circuit is configured to perform a process that includes obtaining an $i^{th}$ group of data from the M groups of data, and parsing each pixel value in the $i^{th}$ group of data, to determine X groups of counters that match the $i^{th}$ group of data in the Y groups of counters stored in the counter cache, wherein X is a positive integer and 1≤X≤Y, wherein the parsing circuit repeatedly performs the process until i=M, wherein i is a natural number whose starting value is 1 and is increased by 1 in each iterative process, wherein the controller is further configured to control, based on the X groups of counters determined by the parsing circuit, the matching-and-decoding circuit to match the $i^{th}$ group of data with each of the X groups of counters in X clock cycles, wherein the matching-and-decoding circuit is configured to perform a second process such that in a $j^{th}$ clock cycle, the matching-and-decoding circuit matches each pixel in the $i^{th}$ group of data with a $j^{th}$ group of counters in the X groups of counters, and instructs, based on a matching result, the count value updating circuit to update a count value of the $j^{th}$ group of counters, wherein the matching-and-decoding circuit repeatedly performs the second process until j=X, wherein j is a natural number whose starting value is 1 and is increased by 1 in each iterative process, and wherein the count value updating circuit is configured to:
    read a current count value of the $j^{th}$ group of counters from the counter cache in the $j^{th}$ clock cycle;
    update the current count value of the $j^{th}$ group of counters based on the matching result indicated by the matching-and-decoding circuit, to obtain an updated count value of the $j^{th}$ group of counters; and
    write back the updated count value of the $j^{th}$ group of counters into the $j^{th}$ group of counters in the counter cache.

15. The multimedia processing system according to claim 14, wherein the histogram application algorithm comprises: any one of a histogram equalization algorithm, an important image feature histogram of oriented gradients (HOG) algorithm, a mean shift algorithm, or a continuously adaptive mean shift algorithm.

16. The multimedia processing system according to claim 14, wherein the multimedia processing system further comprises an obtaining apparatus configured to obtain the multimedia data and write the multimedia data into the memory.

17. The multimedia processing system according to claim 14, wherein the processor and the histogram statistics circuit are integrated into a same integrated circuit (IC).

* * * * *

UNITED STATES PATENT AND TRADEMARK OFFICE
CERTIFICATE OF CORRECTION

PATENT NO. : 10,929,965 B2  
APPLICATION NO. : 16/456916  
DATED : February 23, 2021  
INVENTOR(S) : Yunbi Chen and Kai Hu Page 1 of 1

It is certified that error appears in the above-identified patent and that said Letters Patent is hereby corrected as shown below:

In the Claims

Claim 11, Column 16, Line 4: "wherein when a current count value of any a counter stored" should read "wherein when a current count value of a counter stored"

Signed and Sealed this  
Twenty-seventh Day of April, 2021

Drew Hirshfeld  
*Performing the Functions and Duties of the  
Under Secretary of Commerce for Intellectual Property and  
Director of the United States Patent and Trademark Office*